March 24, 1959 J M. SUMMERS ET AL 2,878,542
FASTENER
Filed Oct. 15, 1953
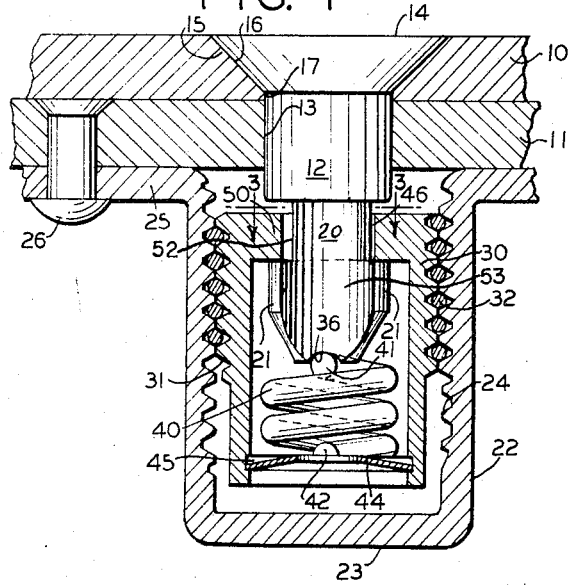
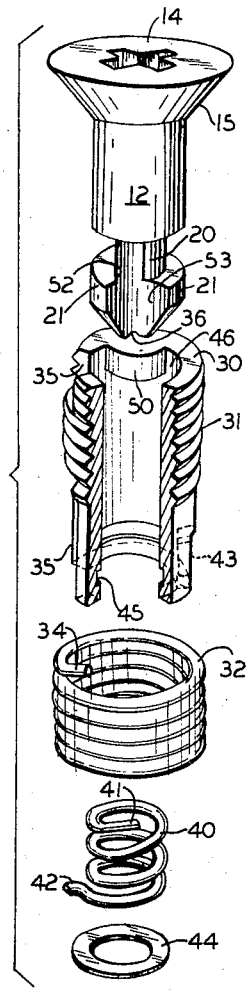
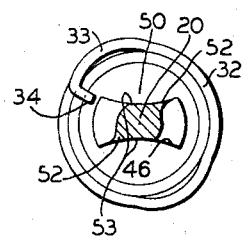
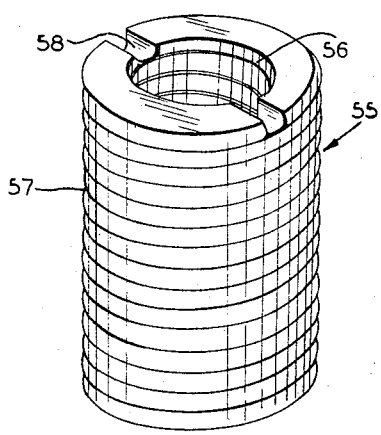
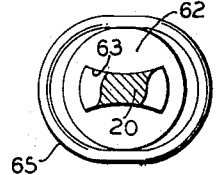
INVENTOR.
J MILLS SUMMERS
JACOB R. NEWCOMER, JR.
BY John P. Chandler
ATTORNEY.

United States Patent Office 2,878,542
Patented Mar. 24, 1959

2,878,542

FASTENER

J Mills Summers, Englewood, and Jacob R. Newcomer, Jr., Westwood, N.J., assignors to Camloc Fastener Corporation, Paramus, N.J., a corporation of New York Application October 15, 1953, Serial No. 386,268

4 Claims. (Cl. 24—221)

This invention relates to a novel fastener which can be quickly fastened and unfastened with equal facility and relates more particularly to an improved fastener of the rotatable stud type which can be manipulated to fastened position by less than one full rotation of the stud.

An important object of the invention is to provide an improved fastener for attaching panels to structures and for other purposes wherein the fastening elements are quickly moved to fully locked position without any relaxation of tension, as opposed to fasteners employing a helical ramp and detent, and wherein the parts, when locked, are positively secured against reverse rotation to unlocked position.

The improved fastener of the present invention has particular usefulness in connection with stressed panels for aircraft wherein it is a common practice to use screws or bolts extending through match-drilled holes to engage a threaded self-locking nut plate riveted to the rear surface of the structure. This common type of arrangement allows for pulling the sheets tightly together only after a comparatively large number of revolutions and depends largely upon friction built up in the plate nut for preventing unscrewing of the bolt due to vibration or other factors.

The shear stresses to which a stressed panel is subjected must be resisted by structural reinforcement around the opening and accordingly it becomes necessary to employ a comparatively large number of fasteners around the opening.

An important object of the present invention is to provide an improved fastener to replace the bolt and plate nut arrangement in the same hole preparation of structure and panel as the bolt and plate nut and the same distance from fastener to fastener around the panel. In the instant fastener, however, the friction threaded engagement is always fully engaged and the parts having this threaded engagement are never removed from full frictional contact and engagement one with the other. Also it is not necessary to have any finding or proper mating of threads and the threads cannot become crossed nor short threaded.

Another object of the invention is to provide a fastener which under normal conditions requires less than one turn to fatsen it or unfasten it and wherein its useful life is many times that of the stop-nut type. Yet another object of the invention is to provide improved locking means to prevent the structure from becoming unfastened due to vibration and wherein the operator always knows when and if the fastener is in fully locked position.

A further object of the invention is to provide a novel fastener of the rotatable stud and receptacle type wherein there is provided resiliently loaded detent means for cooperating with the lower end of the stud, one of the members having a male portion and the other having a detent to receive the male portion under elastic load to resist rotation of the stud.

Yet another object of the invention is to provide improved thread locking means between the threaded parts to resist retrograde rotation due to vibration and other factors.

In the drawings:

Fig. 1 is a central section taken through a fastener embodying the present invention.

Fig. 2 is an exploded view of the stud and insert assembly shown in Fig. 1, a portion of the insert being broken away to show its internal arrangement.

Fig. 3 is a section taken through the shank portion of a stud taken on line 3—3 of Fig. 1 and showing a thread coil with outwardly offset portions for restraining rotation between the insert and the receptacle.

Fig. 4 is a perspective view of a receptacle having external threads for mounting the same.

Fig. 5 is similar to Fig. 3 but shows another type of rotation-restraining means between the insert and the receptacle.

In the structure shown in Fig. 1 two superimposed sheets 10 and 11 are to be secured together by a fastener embodying the present invention, which includes a rotatable stud 12 which, when the parts are in fastened relation, is disposed within an opening 13 in sheet 11, the annular wall of the opening closely fitting the stud.

The stud has a flat head 14 whose frusto-conical lower surface 15 closely fits a flared opening 16 in the upper sheet aligned with opening 13. The shape of the head is, of course, a matter of choice and in the arrangement shown a portion of the main body of the stud is disposed within a non-flared portion 17 of the opening in the upper sheet. Thus the stud takes up shear loads between the sheets at the precise point at which they occur.

A shank 20 extends below the main body portion 12 of the stud and the shank terminates in a cross pin element having opposed lugs 21 with flat upper faces. The cross sectional contour of the shank portion 20, shown in Fig. 3, is provided for a purpose to be described.

The receptacle 22 includes a generally cylindrical body portion having a lower wall 23, internal threads 24 and laterally extending ears 25 for attachment, as by means of rivets 26, to lower sheet 11. If a sealed receptacle is not required the lower wall 23 may be omitted.

An insert 30, shown in some detail in Fig. 2, and having external threads 31, is rotatably carried within the receptacle. As was earlier pointed out, it is necessary or at least desirable in most installations of the present fastener to provide some rotation-restraining means between the insert and the receptacle and in Figs. 1 and 2 this is shown as comprising a helical coil 32 of wire or other material which is carried by the external threads of the insert 30.

In order to have a desired measure of rotation-restraining influence between the threaded elements 22 and 30 the convolutions of the coil are preferably not true circles but have portions 33 (Fig. 3) extending outwardly from the male thread form. As the insert is initially screwed into the receptacle the outward projections 33 are elastically moved inwardly into the thread form. It is desirable that this action does not cause too much circumferential creep of the coil relative to the thread and to this end the terminals of the coil are turned inwardly as shown at 34 and are received in radial slots 35 in the insert. The slots 35 are considerably wider than the diameter of the wire forming thread coil, thus allowing a desired amount of circumferential creep of the thread coil as the insert is rotated back and forth within the receptacle.

The lower end of the shank is formed with a transverse slot 36. A coiled spring 40 has an inwardly turned upper terminal 41 which engages the slot immediately after the stud enters the receptacle and the stud has been rotated 90°.

The spring has an outwardly turned radial terminal 42 at its lower end and this terminal is received in a slot 43 at the lower end of the insert, thus preventing relative rotation between the spring and the insert. The spring itself is supported by a lock washer arrangement 44 in conjunction with an internal annular groove 45 at the lower end of the insert. For the purpose of securing a greater surface contact between the spring and the washer, the lower end of the spring is ground somewhat flat.

The outer peripheries of lugs 21 (Fig. 2) may have substantially the same diameter as main body portion 12 of the stud and concavely curved faces 53 in the lower portion which merge into wing portions 52. In forming the lower section of the stud, including shank portion 20, lugs 21, opposed concavely curved faces 53 and wing portions 52, a simple milling cutter may be employed. The opposed, outwardly extending wing portions 52 form driving surfaces for rotating the insert.

The upper end of the insert is provided with an opening 46 of substantially hour glass shape and having opposed inwardly curved lands 50 forming abutments whose lower faces are flat just as are the upper faces of lugs 21. The lower end of the stud passes through opening 46 until lugs 21 are beyond abutments 50, at which point the stud can then be freely revolved clockwise 90°, causing a bayonet-type engagement between lugs 21 on the stud and abutments 50 on the insert. During the insertion of the stud the end depresses and loads spring 40, causing spring terminal 41 to be forcibly engaged in detent 36 when the stud is revolved the initial 90° mentioned above. This forcible engagement between spring 40 and the stud prevents inadvertent disengagement of lugs 21 and abutments 50 due to vibration or any other cause. It was earlier pointed out that rotation of spring 40 relative to the insert is restrained. The operation of the fastener will now be described in detail. The sheets 10 and 11 are in the position shown in Fig. 1 with the stud carrier in outer sheet 10 and the opening in inner sheet 11 aligned with the stud. The latter is now moved downwardly causing the lugs 21 to pass through opening 46 and when the upper faces of the lugs underlie the lower face of wall 50 of the insert the stud is rotated in a fastening direction. This rotation is free and unobstructed for about 90° at which time the forward faces of the laterally extending wing portions 52 whose cross-sectional contour is clearly shown in Fig. 3 engage the opposed walls of opening 46 at the upper end of the insert.

Near the end of this 90° rotation the upper terminal 41 of the spring enters slot or detent 36 at the lower end of the stud which restrains free reverse rotation of the stud relative to the insert. This restraining force is great enough to effectively lock the parts together even under conditions of extreme vibration. If the sheets have not been tightly drawn together at this stage, further rotation of the stud imparts rotation to the insert, advancing the same, until the sheets are tight.

To release the fastener the stud is rotated reversely and this rotation is relatively free after the end of the spring terminal 41 leaves the detent. During this reverse rotation to release position the insert remains stationary in view of the flat faces on 21 and 50. As soon as the lugs 21 become aligned with opening 46 the stud is released and the lugs pass through the opening.

The modified receptacle 55 shown in Fig. 4 has an internal thread 56 and is otherwise formed the same as receptacle 22 except that it has an external thread 57 which is received within a threaded opening in the second member to be secured. Opposed slots 58 are employed for rotating the receptacle into the threaded opening in the structure. As soon as it has been properly positioned within such threaded opening, it is staked or otherwise secured to prevent rotation.

A modified rotation-restraining arrangement is illustrated in Fig. 5 wherein the insert 62 is provided with an opening 63 for the stud shank to pass therethrough. In this instance, however, the receptacle 65 is not truly circular but is formed with an out-of-round shape such as by compressing two opposed side walls.

While two forms or embodiments of the invention have been shown and described herein for illustrative purposes, and the construction and arrangement incidental to four specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What we claim is:

1. A quick-operating fastener for securing two sheets together comprising a headed stud provided with a cross pin element at its lower end which is carried by one sheet, and a receptacle provided with an insert to receive the stud carried by the other sheet, threads between the receptacle and insert and rotation restraining means associated with the threads, the upper wall of the insert having a non-circular opening shaped to pass the cross pin element therethrough, the upper face of the cross pin element being flat and the meeting face of said upper wall also being flat to permit free rotation between stud and insert, the stud being provided with wing portions above the cross pin element having limited rotation within the upper wall opening and forming opposed driving faces to advance and retract the insert, a spring reacting upwardly against the stud in non-rotative relation to the insert, and detent means between the spring and stud to restrain rotation of the latter.

2. A quick-operating fastener for securing two sheets together comprising a headed stud provided with a cross pin element and a transverse slot at its lower end which is carried by one sheet, and an internally threaded receptacle provided with an externally threaded insert to receive the stud carried by the other sheet, the upper wall of the insert having a non-circular opening shaped to pass the cross pin element therethrough and providing abutments engaged by the cross pin element when the stud is rotated to locking position, the upper face of the cross pin element being flat and the meeting face of said upper wall also being flat to permit free rotation between stud and insert, the stud being provided with wing portions above the cross pin element having limited rotation within the upper wall opening and forming opposed driving faces to advance and retract the insert, a deformed thread coil disposed between the threads of the receptacle and of the insert, a spring reacting upwardly against the stud in non-rotative relation to the insert and provided with an upper terminal which is received in the slot of the stud to restrain rotation of the latter when the stud has been rotated to locking position.

3. A quick-operating fastener for securing two sheets together comprising a headed stud provided with a cross pin element and a radial slot at its lower end which is carried by one sheet, and a receptacle provided with an insert to receive the stud carried by the other sheet, said stud having an upper section of a size which closely fits the openings in the sheets and takes up shear loads therebetween, threads between receptacle and insert and rotation restraining means associated with the threads, the upper wall of the insert having a non-circular opening shaped to pass the cross pin element therethrough; the upper face of the cross pin element being flat and the meeting face of said upper wall also being flat to permit free rotation between stud and insert, the stud being provided with wing portions above the cross pin element having limited rotation within the upper wall opening and forming opposed driving faces to advance and retract the insert, a spring reacting upwardly against the stud in non-rotative relation to the insert, a radial upper terminal of the spring which enters the stud slot to restrain rotation of the stud when the same has been rotated to locked position.

4. A quick-operating fastener for securing two sheets together comprising a headed stud provided with a cross pin element at its lower end which is carried by one sheet and a receptacle provided with an insert to receive the stud carried by the other sheet, threads between receptacle and insert and rotation restraining means associated with the threads, the upper wall of the insert having a non-circular opening shaped to pass the cross pin element therethrough, the upper face of the cross pin element being flat and the meeting face of said upper wall also being flat to permit free rotation between stud and insert, the stud being provided with wing portions above the cross pin element having limited rotation within the upper wall opening and forming opposed driving faces to advance and retract the insert, a spring reacting upwardly against the stud and a detent plate between the spring and stud mounted in non-rotative relation to the insert, the lower end of the stud having a transverse projection which enters the detent in the plate of the stud when the same has been rotated to locked position.

References Cited in the file of this patent
UNITED STATES PATENTS

| | | |
|---|---|---|
| 963,062 | Seddon | July 12, 1910 |
| 1,775,042 | Lemoine | Sept. 2, 1930 |
| 2,123,068 | Summers | July 5, 1938 |
| 2,262,450 | Caminez | Nov. 11, 1941 |
| 2,323,260 | Venditty | June 29, 1943 |
| 2,363,663 | Findley | Nov. 28, 1944 |
| 2,571,641 | Wing | Oct. 16, 1951 |
| 2,757,429 | Summers | Aug. 7, 1956 |